Sept. 11, 1945.　　　H. S. HALLEWELL　　　2,384,674
METHOD OF RENOVATING WORN GAP GAUGES
Filed Feb. 3, 1943　　2 Sheets-Sheet 1

Inventor
H. S. Hallewell
By
Attorney

Sept. 11, 1945.    H. S. HALLEWELL    2,384,674
METHOD OF RENOVATING WORN GAP GAUGES
Filed Feb. 3, 1943    2 Sheets-Sheet 2

Inventor
H. S. Hallewell
By
Attorney

Patented Sept. 11, 1945

2,384,674

UNITED STATES PATENT OFFICE 2,384,674

METHOD OF RENOVATING WORN GAP GAUGES

Harold Stuart Hallewell, Hillingdon, England

Application February 3, 1943, Serial No. 474,605
In Great Britain October 31, 1942

3 Claims. (Cl. 29—148)

This invention relates to a method of renovating worn gap gauges. When the gauge surfaces become worn, thereby destroying the accuracy of the gauge, there has not hitherto been a satisfactory method of renovating or restoring the gauge. It has been proposed to deposit metal, for example, chromium, electrolytically on the worn surfaces and thereafter to regrind these surfaces, but this method has the disadvantage of being costly. Moreover, it is difficult to confine the deposited metal to the gauge surfaces themselves.

Another method that has been practised consists in closing the jaws of the gauge together by hammering the gauge. To enable this to be done the part of the gauge from which the jaws spring must be heated, with the result that the gauge surfaces themselves become softened, owing to the fact that the hammering or forging operation takes so long that the heat is conducted into the jaws themselves.

According to the present invention, a gap gauge is renovated or restored by placing it in a clamp or fixture having surfaces in contact with the outer edges of the jaws, thereby preventing the gauge from expanding in a direction transverse to the gauge surfaces, heating the part of the gauge from which the jaws spring to a temperature sufficiently high to soften it and then allowing it to cool.

It will be appreciated that the heated metal tends to expand, but the aforesaid surfaces of the clamp or fixture prevents expansion. Consequently the softened metal must be deformed and compressed and therefore, after cooling, the width of the gauge is less in a direction perpendicular to the gauge surfaces than it was originally, the amount of this contraction depending upon the temperature to which the metal has been raised. It is found in practice that, if the metal is raised to a bright red heat, the amount of contraction thus obtained is amply sufficient to compensate for amounts of wear which would otherwise be sufficient to make the gauge useless.

The heating of the metal may be effected in any convenient way. It is preferred, however, to generate heat by passing a heavy electric current through the part of the gauge to be heated. For this purpose an apparatus resembling an electric resistance welding machine may conveniently be employed. This apparatus essentially consists of two massive electrodes, each having copper-faced clamps between which the jaws of the gauge can be gripped. The two electrodes are insulated from one another, one of them is fixed to the bed of the apparatus, and the other is adjustable by means of a screw. When the gauge is inserted, the screw is operated so that the surfaces of the electrodes abut firmly against the outer edges of the gauge jaws. The clamps are then tightened so as to bring the copper facings into firm contact with the faces of the jaws. A heavy heating current from the welding transformer is then passed through the part of the gauge which bridges the gap between the two electrodes. As soon as the required temperature is reached, the welding current is cut off, the clamps are slightly loosened to permit contraction, and the gauge is allowed to cool. It may, of course, be removed from the electrodes after the heated part has become rigid, and the cooling may be hastened by quenching in water or oil.

Owing to the fact that the copper facings are in contact with the sides of the gauge jaws, the jaws are maintained cool enough to avoid softening. Preferably the clamps are water-cooled to enhance the cooling effect.

Referring to the accompanying drawings—

Figure 2:
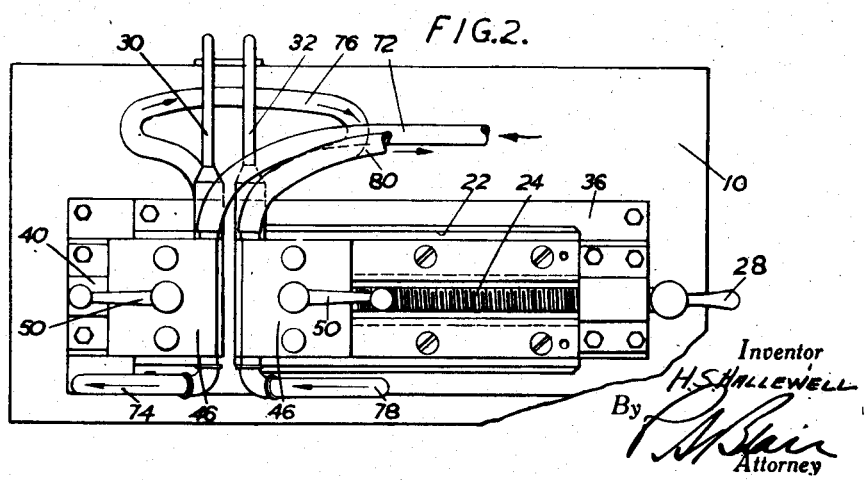
Figure 2 is a plan view of the apparatus of Fig. 1.

The apparatus includes a base casting 36 bolted to a housing 10 enclosing a transformer that provides the heating current. Two clamping electrodes designated generally 18, 20 are provided, the electrode 18 being rigidly fixed and the electrode 20 being mounted to slide in guides 22 towards and away from the fixed electrode. A feed-screw 24 works in a nut 26 fixed to the stand and is provided with a handle 28. The electrodes are connected to the secondary winding of the transformer by means of heavy leads 30, 32 (Figure 2).

The fixed electrode 18 comprises a body 34 bolted to the base casting 36, strips of insulating material 38 being interposed. The back of the body 34 is supported by a heavy buttress 40 between which and the body 34 a sheet of insulating material 42 is interposed.

The body 34 is formed with an extension 44, constituting the lower jaw of the clamp, the upper jaw 46, L-shaped in side elevation being movable vertically by means of a clamping screw 48, provided with a handle 50. Copper plates 52 are secured to the faces of the two jaws 44, 46.

The movable electrode 20 is similar in construction to the fixed electrode 18, and its parts have the same reference numerals. The movable electrode 20 is, however, not insulated from the casting 36 and, instead of being supported by a buttress 40, the back of the body 34 is engaged by the end of the screw 24, which is formed with a portion 56 of enlarged diameter co-operating with a plate 58 formed with a rebated hole and secured to the body by means of screws 60. This arrangement enables the movable electrode to be advanced towards the fixed electrode or retracted from it by rotating the screw 24 in one direction or the other.

The upper portion of each of the two movable clamp jaws 46 rests upon the heads of a pair of screws 62, adjustable in screw-threaded holes in extensions 64 of the body 34. It will be appreciated that the vertical travel of the jaws 46 is very small, being only just sufficient to tighten the jaws upon the gauge to be treated, and that in consequence the fact that the upper parts of these jaws are fixed abutments does not interfere with the correct clamping action. The screws can be adjusted to suit gauges of different thicknesses.

The clamping screw 48 of the fixed electrode is screwed into a threaded bore in the body 34. The arrangement is slightly different for the movable electrode, of which the clamping screw 48 engages a screw-threaded bore in the shank 66 of a large headed pin, the head 68 of which, being drawn upwards when the clamp is tightened serves to clamp the electrode on the guides 22.

The four jaws 44, 46 are formed with transverse bores 70, through which water is circulated to cool the jaws. Water is supplied through a pipe 72 to one end of the bore 70 in the upper jaw of the fixed electrode. From that bore it passes through a connecting pipe 74 at the front of the apparatus to the bore in the lower jaw. From thence it passes through a pipe 76 at the back of the apparatus to the bore in the lower jaw of the movable electrode, then through a pipe 78 at the front to the bore in the upper jaw from which it is led away through a pipe 80. The pipes 74, 76 and 78 are of considerable length, and somewhat resemble expansion bends in a steam pipe, so as to enable the upper jaws of the clamps to be operated and the movable electrode to be traversed without interrupting the flow of water.

Figure 1:
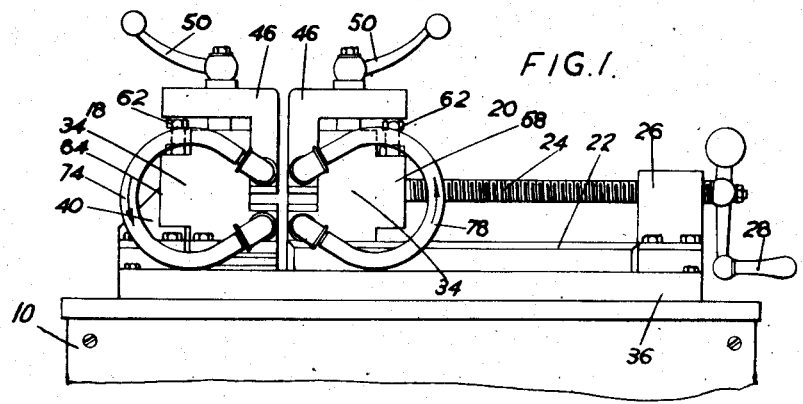
Figure 1 is a front elevation of an apparatus suitable for use in carrying the invention into effect.
Figure 4:
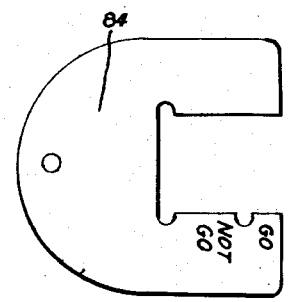
Figures 4 and 5 are representations of gauges to which the invention relates.
Figure 5:
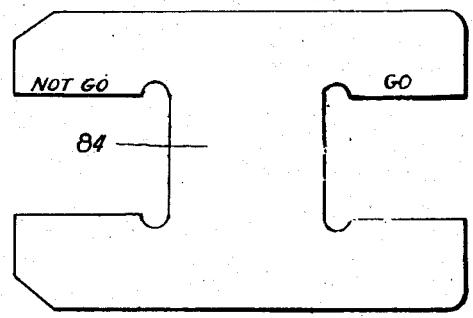
Figure 3:
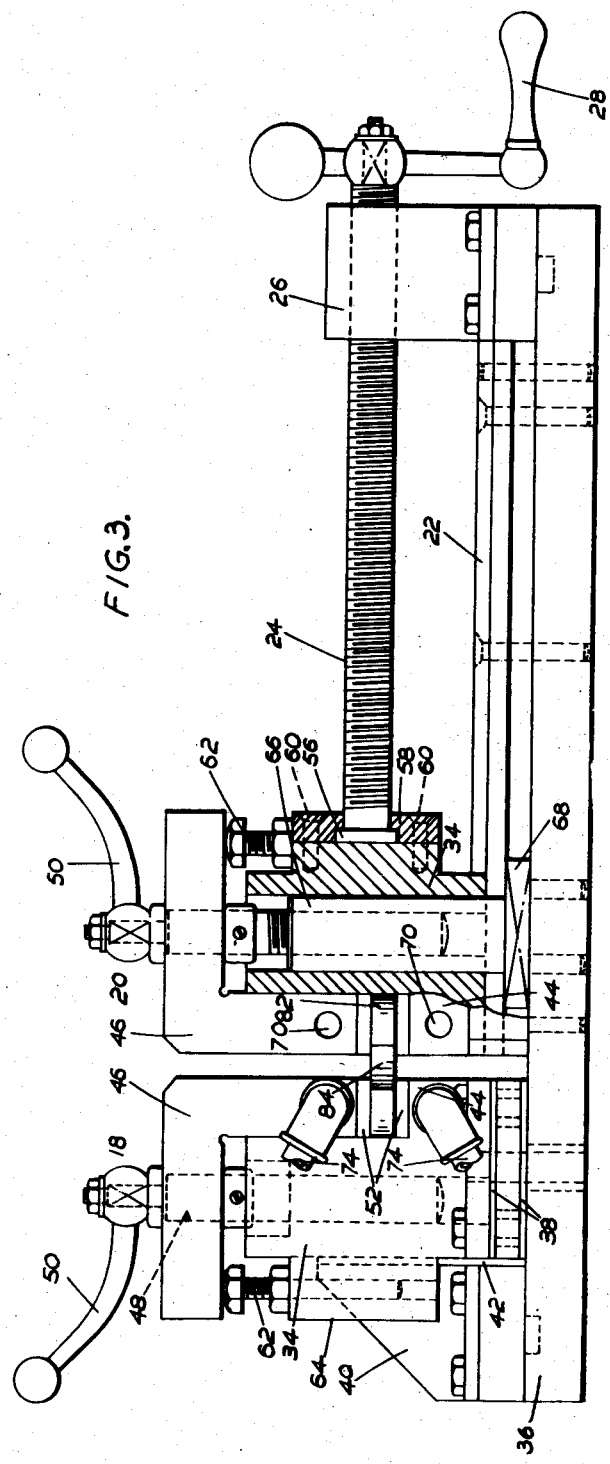
Figure 3 is a front elevation partly in section of the apparatus on a larger scale with a gauge clamped in position.

Figure 4 represents a single-ended gap gauge, having two gaps one of which represents the upper limit of tolerance and the other the lower limit. Figure 5 represents a double-ended gauge having a single gap at each end, one for the upper limit, and the other for the lower limit. Worn gauges of both types can be treated in the apparatus described above. In either case the gauge, shown at 82 in Figure 3, is inserted between the jaws 44, 46 of the two electrodes and the screw 24 is turned to clamp the gauge edgewise between the bodies 34 of the electrodes. The handles 50 are then turned to clamp it flatwise between the copper plates 52. The transformer is then switched on so that a heavy current of low voltage will then pass through the part 84 of the gauge which spans the space between the two electrodes and this part of the gauge will therefore be heated and will tend to expand. This expansion will be resisted by the electrodes, and when the metal of the gauge has become softened it will yield, being compressed upon itself. As soon as this action has taken place, the primary circuit is broken, the clamp jaws 46 are eased, and the gauge is allowed to cool. It can be removed from the apparatus as soon as it has attained a temperature low enough for it to be rigid and, if desired, the further cooling can be hastened by quenching. The gaps in the gauge will now be narrower than they were previously because the expansion due to the heating was not allowed to take place, whereas the subsequent contraction on cooling was allowed to take place. The gauge surfaces can now be reground to bring the gaps to the dimensions that they had originally.

It will be evident that an actual electric resistance welding machine could be used instead of an apparatus constructed especially for the purpose. Moreover, although it is preferred to employ an electric current for heating, it would be within the scope of the invention to apply heat to the gauge in any other way, for example by applying a flame to the part of the gauge to be heated.

I claim:

1. The method of renovating or restoring worn gap gauges which consists in clamping the jaws of the gauge flatwise between jaws of a clamp or fixture of high conductivity metal thereby preventing the gauge from expanding in a direction transverse to the gauge surfaces, heating the part of the gauge from which the jaws spring to a temperature high enough to soften it, then allowing it to cool and operating upon the measuring surfaces of the gauge bounding the gaps to restore the original dimensions of the gaps.

2. The method of renovating or restoring worn gap gauges which consists in placing the gauge in a clamp or fixture having abutment surfaces in contact with the outer edges of the jaws of the gauge, thereby preventing the gauge from expanding in a direction transverse to the gauge surfaces, heating the part of the gauge from which the jaws spring by passing an electric current through the gauge to a temperature high enough to soften it, then allowing it to cool and operating upon the measuring surfaces of the gauge bounding the gaps to restore the original dimensions of the gaps.

3. The method of renovating or restoring worn gap gauges which consists in clamping the jaws of the gauge flatwise between jaws of a clamp or fixture of high conductivity metal thereby preventing the gauge from expanding in a direction transverse to the gauge surfaces, heating the part of the gauge from which the jaws spring by passing an electric current through the gauge, to a temperature high enough to soften it, then allowing it to cool and grinding the measuring surfaces of the gauge adjoining the gaps to restore the original dimensions of the gaps.

HAROLD STUART HALLEWELL.